US008996256B2

(12) United States Patent
Inamoto (10) Patent No.: US 8,996,256 B2
(45) Date of Patent: Mar. 31, 2015

(54) COMMUNICATION SYSTEM FOR A PASSENGER PROTECTION SYSTEM

(75) Inventor: Takashi Inamoto, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/302,243

(22) Filed: Nov. 22, 2011

(65) Prior Publication Data

US 2012/0136541 A1   May 31, 2012

(30) Foreign Application Priority Data

Nov. 25, 2010   (JP) .................................. 2010-262426
Oct. 24, 2011   (JP) .................................. 2011-232645

(51) Int. Cl.
*B60R 21/0132*   (2006.01)
*B60R 21/017*   (2006.01)

(52) U.S. Cl.
CPC ......... *B60R 21/0173* (2013.01); *B60R 21/0132* (2013.01)
USPC ............. 701/45; 714/701; 714/716; 370/245; 710/9

(58) Field of Classification Search
None
See application file for complete search history.

(56) References Cited

U.S. PATENT DOCUMENTS

| 5,835,873 | A  | * | 11/1998 | Darby et al. ..................... 701/45 |
| 6,166,653 | A  | * | 12/2000 | Schulmeyer et al. ......... 340/9.16 |
| 6,392,558 | B1 | * | 5/2002  | Schulmeyer et al. ......... 340/9.16 |
| 6,449,544 | B1 | * | 9/2002  | Nitschke et al. ................ 701/45 |
| 6,583,628 | B2 | * | 6/2003  | Ropke ........................... 324/523 |
| 7,487,022 | B2 | * | 2/2009  | Glaser ............................. 701/45 |
| 7,668,991 | B2 | * | 2/2010  | Kopplin ........................ 710/104 |
| 8,122,159 | B2 | * | 2/2012  | Monreal .......................... 710/9 |

(Continued)

FOREIGN PATENT DOCUMENTS

| EP | 2110284 A1 * | 10/2009 | .......... B60R 21/0136 |
| JP | 03-167935 | 7/1991 | |

(Continued)

OTHER PUBLICATIONS

Ian F. Akyildiz, Ismail H. Kasimoglu, Wireless sensor and actor networks: research challenges, Ad Hoc Networks, vol. 2, Issue 4, Oct. 2004, pp. 351-367, ISSN 1570-8705, 10.1016/j.adhoc.2004.04.003. (http://www.sciencedirect.com/science/article/pii/S1570870504000319).*

(Continued)

*Primary Examiner* — Redhwan K Mawari
*Assistant Examiner* — Edward Torchinsky
(74) *Attorney, Agent, or Firm* — Harness, Dickey & Pierce, PLC (57) ABSTRACT

In each sensor unit, when a sensor control unit cannot detect current flowing to an output side, its address is set to the same address as a sensor unit of the last stage. In an ECU, if the set address and characteristic information of each sensor unit are not stored in a memory unit when the set addresses and the characteristic information of all the sensor units are received by an ECU control unit, the received set addresses and the characteristic information are stored. A failure check unit checks received characteristic information received by the ECU control unit with characteristic information stored in the memory unit. If one characteristic information is in disagreement, a sensor unit having such characteristic information is determined to be failing. If plural characteristic information are in disagreement, a sensor unit having characteristic information and closest to the ECU is determined to be failing.

18 Claims, 8 Drawing Sheets

(56) References Cited

U.S. PATENT DOCUMENTS

| | | | |
|---|---|---|---|
| 8,213,321 B2 * | 7/2012 | Butts et al. | 370/251 |
| 2007/0204082 A1 | 8/2007 | Shimizu | |
| 2009/0327474 A1 | 12/2009 | Ida | |
| 2010/0121534 A1 | 5/2010 | Tanaka | |

FOREIGN PATENT DOCUMENTS

| | | |
|---|---|---|
| JP | 11-027298 | 1/1999 |
| JP | 2000-354052 | 12/2000 |
| JP | 2007-235347 | 9/2007 |
| JP | 2007-235349 | 9/2007 |
| JP | 2009-206634 | 9/2009 |
| JP | 2010-137840 | 6/2010 |
| JP | 2011-35817 | 2/2011 |

OTHER PUBLICATIONS

Office action dated Nov. 21, 2013 in corresponding Chinese Application No. 201110380861.3.

* cited by examiner

|  | FIRST SENSOR (15a1) | SECOND SENSOR (15b2) | THIRD SENSOR (15c3) | FOURTH SENSOR (15d4) |
|---|---|---|---|---|
| ADDRESS | 0100 | 0001 | 0010 | 0001 |
| INITIALIZATION | OK | NG | OK | NG |
| CHARACTERISTIC INFORMATION No. | A | — | C | — |

COMMUNICATION SYSTEM FOR A PASSENGER PROTECTION SYSTEM

CROSS REFERENCE TO RELATED APPLICATION

This application is based on and incorporates herein by reference Japanese patent applications No. 2010-262426 filed on Nov. 25, 2010 and No. 2011-232645 filed on Oct. 24, 2011.

FIELD OF THE INVENTION

The present invention relates to an ECU (electronic control unit), which is used for a passenger protection device such as an airbag for protecting a passenger in case of vehicle collision, and a communication device for a passenger protection system, which has a plurality of sensor units connected to the ECU in a daisy chain form for detecting acceleration of a vehicle.

BACKGROUND OF THE INVENTION

Figure 8:
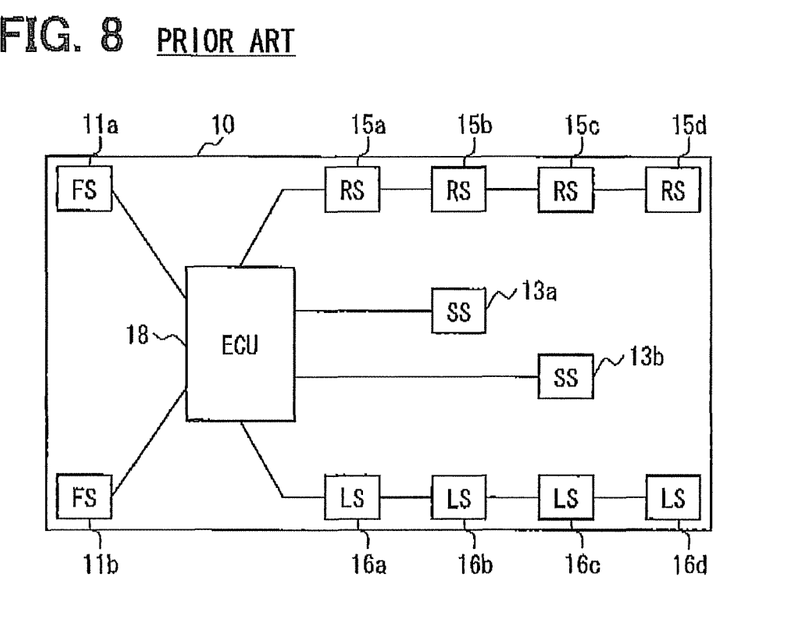
FIG. 8 is a diagram showing an ECU and sensor units of a conventional communication device for a passenger protection system in a vehicle.

Recently a passenger protection device such as an airbag and a seatbelt pretensioner is mounted in many vehicles. A passenger protection system having the passenger protection device includes, as shown in FIG. 8, front sensor units 11a, 11b mounted at both front sides of a vehicle 10, safing sensor units 13a, 13b mounted at an assistant seat and rear seats, and a plurality of sensor units 15a, 15b, 15c 15d and 16a, 16b, 16c, 16d mounted at both sides of the vehicle 10. These sensor units are connected to an ECU 18 for an airbag to form a communication device. Each sensor unit 11a, 11b, 13a, 13b, 15a to 15d and 16a to 16d detects acceleration and activates an airbag, which is not shown, in response to detection of acceleration. Here, each sensor unit 11a, 11b, 13a, 13b, 15a to 15d and 16a to 16d is formed in an integrated circuit (IC) chip.

Figure 9:
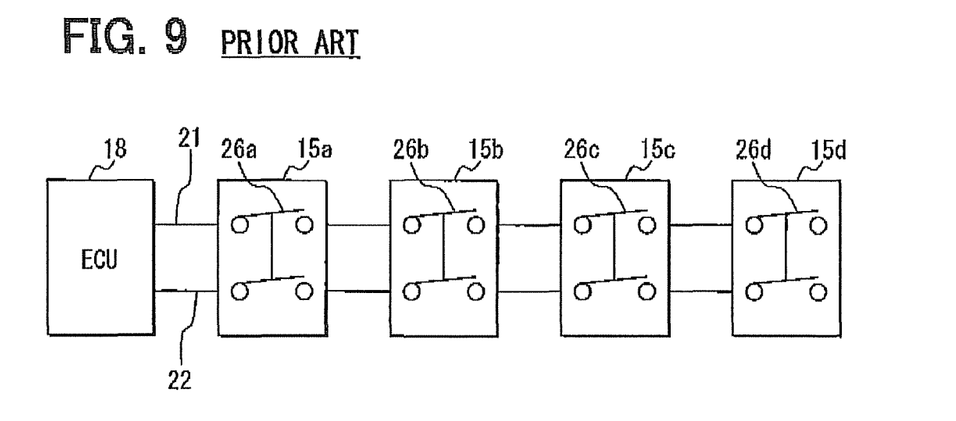
FIG. 9 is a diagram showing an ECU and sensor units, which are connected to the ECU by buses, in the conventional communication device for a passenger protection system.

In this communication device, as representatively shown in FIG. 9, the sensor units 15a to 15d and 16a to 16d at both sides have respective bus switches 26a to 26d internally and are connected to the ECU 18 through buses. Further, when power supply of the vehicle 10 is turned on, the sensor units are set with addresses and initialized to turn on the bus switches 26a to 26d in order from the sensor unit closer to the ECU 18. That is, after setting the address in the first sensor unit 15a, which is closest to the ECU 18, the bus switch 26a is turned on to connect the ECU 18 to the second sensor unit 15b. After setting the address in the second sensor unit 15b from the ECU 18, the bus switch 26b is turned on to connect the third sensor unit 15c to the ECU 18. Further, after setting the address in the third sensor unit 15c, the bus switch 26c is turned on to connect the fourth sensor unit 15d to the ECU 18. The initialization is thus performed. Each of the sensor units 15a to 15d is configured to return a response to the ECU 18 after the address setting.

In case that the sensor units 15a to 15d and 16a to 16d on both sides are connected to the ECU 18 by buses, it is necessary to provide the bus switches 26a to 26d inside the sensor units 15a to 15d and 16a to 16d formed in IC chips, respectively. As a result, the chip size becomes large. Since each bus switch has impedance, the impedances of the sensor units 15a to 15d and 16a to 16d cause voltage drops when the plurality of the sensor units 15a to 15d are bus-connected. As a result, the voltage drops at the sensor units 15d, 16d of the end stage become large. In addition, the bus switch becomes a noise source, which generates noise, when impedances at the power supply side and the ground side of the bus switches do not match.

Figure 10:
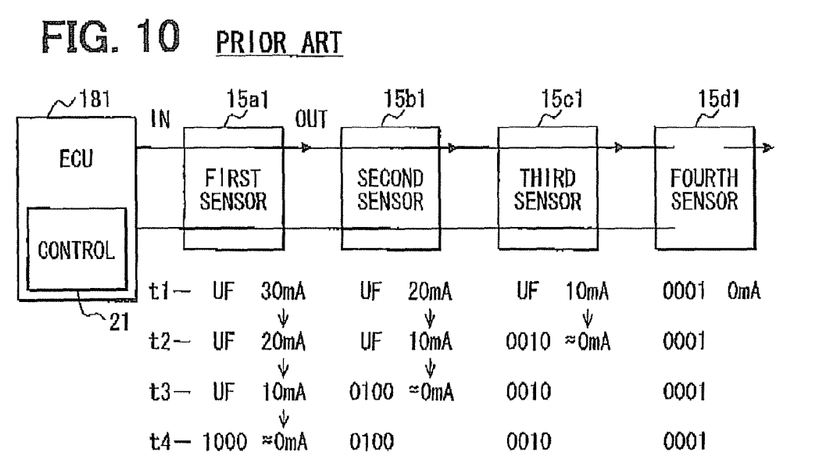
FIG. 10 is a diagram showing an ECU and sensor units, which are connected to the ECU by buses, in a conventional communication device for other passenger protection system.

To solve this problem, according to a communication device disclosed in JP 2010-137840A (US 2010/0121534A1), bus connection by bus switches is not performed. According to this configuration, as shown in FIG. 10, sensor units 15a1 to 15d1 are connected to an ECU 181 in a daisy chain form without using bus switches. In this configuration, the sensor unit 15d1 at the last stage is set with an address 0001 at time t1 first for transition to a sleep mode. Since no current flows to the fourth sensor unit 15d1, which is in the sleep mode, the third sensor unit 15c becomes the last stage unit and ready for being set with an address. Similarly as described above, the third sensor unit 15c1 is set with an address 0010 at time t2 for transition to the sleep mode. Further, as indicated at time t3 and t4, addresses 0100 and 1000 are set in the sensor units in sequence toward the ECU 181 and the sensor units are rendered to be in the sleep mode in sequence. Thus, the initialization is completed. After completion of the initialization, the ECU 181 transmits a sleep mode cancellation command thereby to cause the sensor units 15a1 to 15d1 to return to respective normal operation mode. Thus bus switches are not necessitated.

Figure 11:
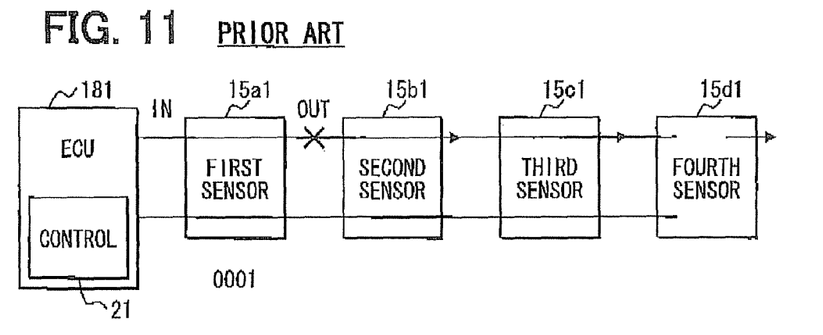
FIG. 11 is a diagram showing an open-failure in the communication device for a passenger protection system of FIG. 10.
Figure 12:
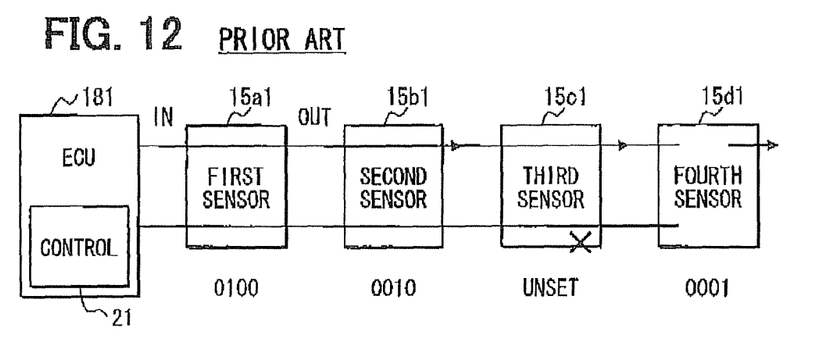
FIG. 12 is a diagram showing a sensor-failure in the communication device for a passenger protection system of FIG. 10.

It is assumed in this communication device for a passenger protection system that a connection line between the first sensor unit 15a1 and the second sensor unit 15b1 is disconnected (open-failure) as indicated by a mark X in FIG. 11, or the third sensor unit 15c1 fails (sensor failure) as indicated by a mark X in FIG. 12 although the current path from the ECU 181 to the sensor unit 15d1 at the last stage is normal. In this case, as described later, it is not possible to determine whether it is the open-failure or the sensor-failure. It is not possible either to specify between which sensor units the open-failure arose or which sensor unit has the sensor-failure.

That is, in case of determining the open-failure or the sensor-failure, ECU 181 is configured to determine whether the address setting at the time of initialization has been performed normally. In FIG. 11, since the first sensor unit 15a1 is the last stage unit, the address 0001 is set in the first sensor unit 15a1 first. If the first sensor unit 15a1 is rendered to be in the sleep mode, thereafter no other sensor unit is connected to the ECU 181. As a result, the address setting is performed only once. The ECU 181 determines that the open-failure or the sensor-failure is present based on that the address setting is not performed appropriately.

In FIG. 12, when the sensor unit 15d1 at the last stage is set with the address 0001 and then rendered to be in the sleep mode, the second sensor unit 15b1 is set with the address 0010 because of the sensor-failure of the third sensor unit 15c1. Then the first sensor unit 15a1 is set with the address 0100. In this case, only three addresses are set although four addresses should be set. The ECU 181 determines that the open-failure or the sensor-failure is present based on that the address setting has not been performed normally. In either case, it is not possible to determine whether the failure is the open-failure or the sensor-failure. It is not possible either to specify between which sensor units the open-failure arose or which sensor unit has the sensor-failure.

SUMMARY OF THE INVENTION

It is therefore an object of the present invention to provide a communication device for a passenger protection system, which can specify a location of an open-failure between sensor units and a sensor unit having a sensor-failure.

A communication device for a passenger protection system according to the present invention includes an ECU for controlling a passenger protection device, which protects a passenger at time of vehicle collision, and a plurality of sensor units connected to the ECU in a daisy chain form for detecting acceleration of the vehicle and transmitting an acceleration signal to the ECU. The sensor units, after being initialized by setting of respective set addresses in correspondence to address setting instructions of the ECU, transmit the respective set addresses and characteristic information. The ECU includes a memory unit, which stores as correspondence information, in which the characteristic information transmitted from the sensor units are corresponded to the set addresses, respectively. The ECU further includes a failure check unit, which checks up the characteristic information transmitted from the sensor units with the correspondence information with respect to each of the set addresses, if the characteristic information are stored in the memory unit, and determines that the sensor unit having the characteristic information, which disagrees with the correspondence information as a result of checkup, is failing.

According to this configuration, it is possible to determine that, if the characteristic information in disagreement is one, the sensor unit having this characteristic information is failing.

DETAILED DESCRIPTION OF THE EMBODIMENT

Embodiments of the present invention will be described below with reference to the drawings. Mutually corresponding parts are designated by same reference numerals in all the drawings of the present application and the description about the overlapping parts will be omitted below.

First Embodiment

Figure 1A:
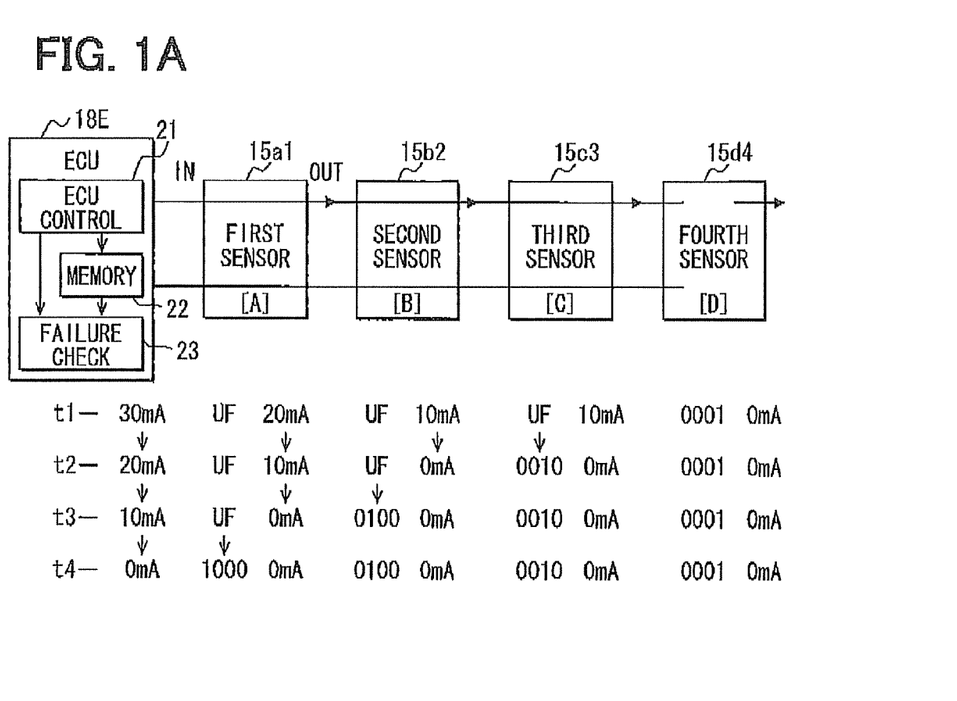
FIG. 1A is a block diagram showing an ECU and sensor units, which are connected in a daisy chain form without bus switches, in a communication device for a passenger protection system according to a first embodiment of the present invention.

A communication device shown in FIG. 1A corresponds to the communication device for the passenger protection system of the vehicle 10 shown in FIG. 8. That is, an ECU 18E corresponds to the ECU 18, and the sensor units 15a1 to 15d4 correspond to the sensor units 15a to 15d.

Figure 1B:
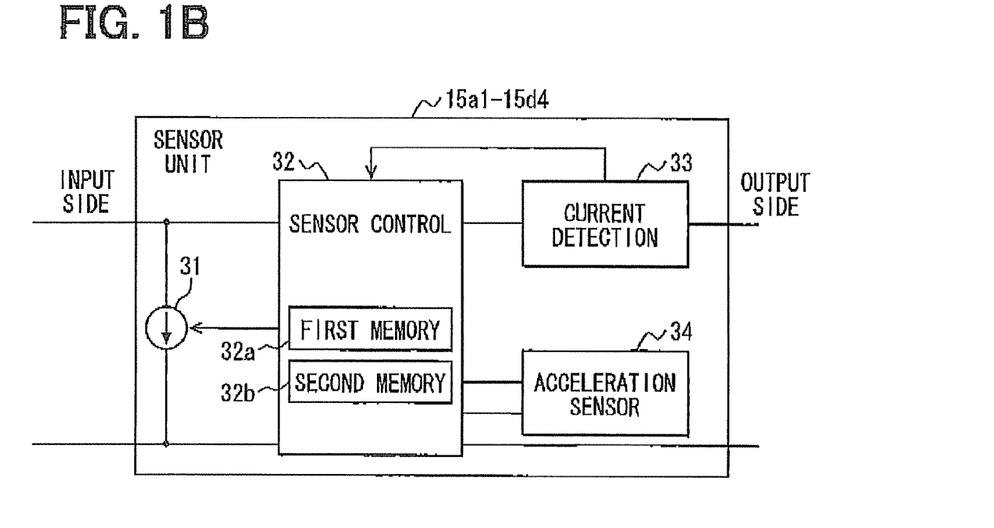
FIG. 1B is a block diagram of each sensor unit shown in FIG. 1A.

The communication device for a passenger protection system according to the present embodiment includes an ECU control unit (control unit) 21, a memory unit 22 and a failure check unit 23 in the ECU 18E. As shown in FIG. 1B, each of the sensor units 15a1 to 15d4 includes a constant current unit 31, a sensor control unit 32 having a first memory unit 32a and a second memory unit 32b, a current detection unit 33 and an acceleration sensor 34. The constant current unit 31 is connected between both lines of a power supply side and a ground side for connection to the ECU 18E in a daisy chain form. The first memory unit 32a may be a read/write RAM (Random Access Memory) and the like, which stores identification addresses. The second memory unit 32b includes a ROM (Read Only Memory), which is capable of only reading.

The constant current unit 31 draws a constant current of a value (10 mA) of input current supplied from the ECU 18E side to supply a current to a low potential side of the ECU 18E. The current detection unit 33 detects a current value of current flowing to the output side in the subject sensor unit and outputs a detected current value to the sensor control unit 32.

The sensor control unit 32 controls communication with the ECU 18E such as transmission of acceleration value of the vehicle 10 detected by the acceleration sensor 34 to the ECU 18E. When the detected current value of the current detection unit 33 at the initialization processing time is generally 0 mA (first predetermined value), the sensor control unit 32 further stores an identification address in the first memory unit 32a and sets it in correspondence to the number of times of address setting instructions from the ECU 18E. When the address setting is completed normally, the sensor control unit 32 transmits the set address and the characteristic information such as a production lot stored in the second memory unit 32b to the ECU 18E. Further, the sensor control unit 32 turns the constant current unit 31 to the off-state and only holds the set address. The sensor control unit 32 thus renders the sensor unit to be in the sleep mode, in which the current value becomes a standby power near zero. In this sleep mode, the load current in the sensor unit is actually near zero (first predetermined value). This current value, however, is referred to as 0 mA for simplified explanation.

For example, it is assumed that each second memory unit 32b stores characteristic information A in the first sensor unit 15a1, characteristic information B in the second sensor unit 15b2, characteristic information C in the third sensor unit 15c3 and characteristic information D in the fourth sensor unit 15d4. When the sensor control unit 32 detects that the detected current value of the current detection unit 33 is 0 mA in the fourth sensor unit 15d4, which is the last stage unit, the sensor control unit 32 sets the identification address 0001 in the first memory unit 32a in correspondence to the number of times of the address setting instruction (first time). The sensor control unit 32 transmits this set address 0001 and the characteristic information D to the ECU 18E and renders the sensor unit to be in the sleep mode by turning off the constant current unit 31. Since the current value of the fourth sensor unit 15d4 thus becomes 0 mA, the current value at the output side of the third sensor unit 15c3 becomes 0 mA. When the ECU 18E receives an address setting response from the fourth sensor unit 15d4, the ECU 18E transmits a second-time address setting instruction.

When the sensor control unit 32 of the third sensor unit 15c3 detects this 0 mA at time t2, the sensor control unit 32 sets the identification address 0010 in correspondence to the number of times of the address setting instruction (second time). The sensor control unit 32 transmits this set address 0010 and the characteristic information C to the ECU 18E and renders the sensor unit to be in the sleep mode by turning off the constant current unit 31. Since the current value of the third sensor unit 15c3 thus becomes 0 mA, the current value at the output side of the second sensor unit 15b2 becomes 0 mA. When the ECU 18E receives an address setting response from the third sensor unit 15c3, the ECU 18E transmits a third-time address setting instruction.

In the similar manner thereafter, the sensor control unit 32 sets the identification address 0100 in correspondence to the number of times of the address setting instruction (third time) in response to detection of 0 mA at time t3 in the second sensor unit 15b2. The sensor control unit 32 transmits this set address 0100 and the characteristic information B and renders the sensor unit to be in the sleep mode by turning off the constant current unit 31. When the ECU 18E receives an address setting response from the second sensor unit 15b2, the ECU 18E transmits a fourth-time address setting instruction.

The sensor control unit 32 sets the identification address 1000 in correspondence to the number of times of the address setting instruction (fourth time) in response to detection of 0 mA at time t4 in the first sensor unit 15a1. The sensor control unit 32 transmits this set address 1000 and the characteristic information A and renders the sensor unit to be in the sleep mode by turning off the constant current unit 31.

Figure 2:
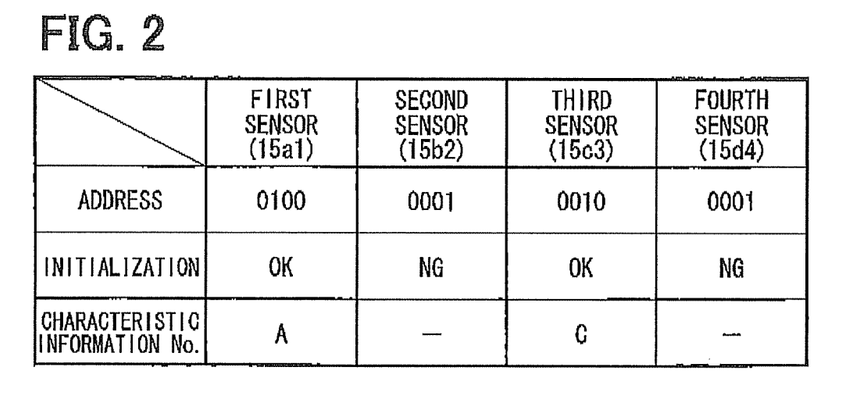
FIG. 2 is a table showing a relation among a set address, an initialization state and a characteristic information number of each sensor unit.

When the current detection unit 33 cannot detect current, the sensor control unit 32 sets the identification address 0001 in the first memory unit 32a in correspondence to the number of times of address setting instruction (for example, first time) from the ECU 18E even if such a sensor unit (for example, 15b2) is in the middle of a group of sensor units 15a1 to 15d4. It is assumed, for example, that the second sensor unit 15b2 fails and the current detection unit 33 cannot detect current as shown in FIG. 2. If the address setting instruction is the first time, the identification address 0001 is set in correspondence to this number of times of address setting instruction. This address is the same as the address 0001, which has been set in the fourth sensor unit 15d4 in the last stage. If the same address 0001 is thus set, the ECU control unit 21 in the ECU 18E cannot recognize the identification addresses in both sensors because response signal waveforms are the same and interfere.

Further, as shown in FIG. 2, the sensor control unit 32 is configured to set the identification address 0100 in the first sensor unit 15a1, that is a pre-stage of the second sensor unit 15b2, in which current cannot be detected. This identification address 0100 follows the set address 0010 in the third sensor unit 15c3 that is a post-stage of the second sensor unit 15b2, in which current cannot be detected.

If the sensor unit is not incapable of the above-described current detection operation but its function is failing, the sensor control unit 32 cannot set an identification address nor transmit the set address and the characteristic information to the ECU 18E.

The ECU control unit 21 receives the set address and the characteristic information transmitted from each sensor 15a1 to 15d4 at the time of initialization processing and determines whether the initialization processing has been competed in all the sensor units 15a1 to 15d4. If nothing has been stored in the memory unit 22 after determination of completion of the initialization processing in all the sensor units 15a1 to 15d4, the set address and the characteristic information transmitted from each of the sensor units 15a1 to 15d4 are paired as a correspondence information for each sensor unit and the correspondence information is stored in the memory unit 22.

The ECU control unit 21 further counts the number of sensor units initialized (initialized sensor count) and the number of addresses set at the time of initialization (set address count) in correspondence to the set addresses and the characteristic information transmitted from the sensor units 15a1 to 15d4. The ECU control unit 21 outputs these count information and the characteristic information to the failure check unit 23.

When the ECU control unit 21 determines that the initialization processing has been completed in all the sensor units 15a1 to 15d4, the failure check unit 23 checks the characteristic information of all the sensor units 15a1 to 15d4 received by the ECU control unit 21 with respective characteristic information stored in the memory unit 22. If the characteristic information are the same for all the sensor units, the ECU control unit 21 determines that the sensor units are normal. If the result of the check indicates the characteristic information is not the same, the characteristic information, C for example, which is stored in the memory unit 22 and is different, the characteristic information is updated and rewritten to the characteristic information, E for example (overwriting E on C), which was read from the ECU control unit 21 into the failure checkup unit 23.

This example indicates that, the third sensor unit 15c3, for example, which has characteristic information (for example, E) determined to be different, had originally the characteristic information C but was replaced with a new third sensor unit 15c3, which has a different characteristic information E, for some reason such as failure. For this reason, in this case, the characteristic information C, which has been stored in the memory unit 22 and different, is updated by rewriting with the characteristic information E, which is read from the ECU control unit 21 into the failure check unit 23. After this updating, all the sensor units 15a1 to 15d4 are reset again and initialized again.

If the ECU control unit 21 determines that the initialization processing has not been completed in any of the sensor units 15a1 to 15d4, the failure check unit 23 checks the characteristic information of the plurality of sensor units received by the ECU control unit 21 with the respective characteristic information stored in the memory unit 22. If the number of different characteristic information is one (for example D), the failure check unit 23 determines that the fourth sensor unit 15d4 having the characteristic information D has a failure. If the number of different characteristic information is plural (for example, D and B), the failure check unit 23 determines that the second sensor unit 15b2 having the characteristic information B, which is closer to the ECU 18E among the characteristic information D and B, has a failure.

Differences of plural characteristic information (for example, D and B) indicates that the two characteristic information D and B are not recognized by the ECU control unit 21 and not inputted to the failure check unit 23. This case exemplifies that the sensor units 15b2 and 15d4 of the two characteristic information B AND D are set with the same address 0001 and hence the ECU control unit 21 cannot recognize the characteristic information B AND D of the sensor units 15b2 and 15d4 because of interference between signal waveforms transmitted to the ECU 18E.

If the ECU control unit 21 determines that the initialization processing has not been completed in any of the sensor units 15a1 to 15d4, the failure check unit 23 determines a specific failure in case that the memory unit 22 stores nothing. The specific failure indicates a failure, which is other than a failure in one sensor unit or a failure in the sensor unit closest to the ECU 18E among the plurality of sensors.

An operation of the communication device for a passenger protection system will be described with reference to flowcharts shown in FIG. 3 to FIG. 5. It is assumed that the second memory unit 32b in each of the sensor units 15a1 to 15d4 connected to the ECU 18 stores the characteristic information A in the first sensor unit 15a1, the characteristic information B in the second sensor unit 15b2, the characteristic information C in the third sensor unit 15c3 and the characteristic information D in the fourth sensor unit 15d4.

Figure 3:
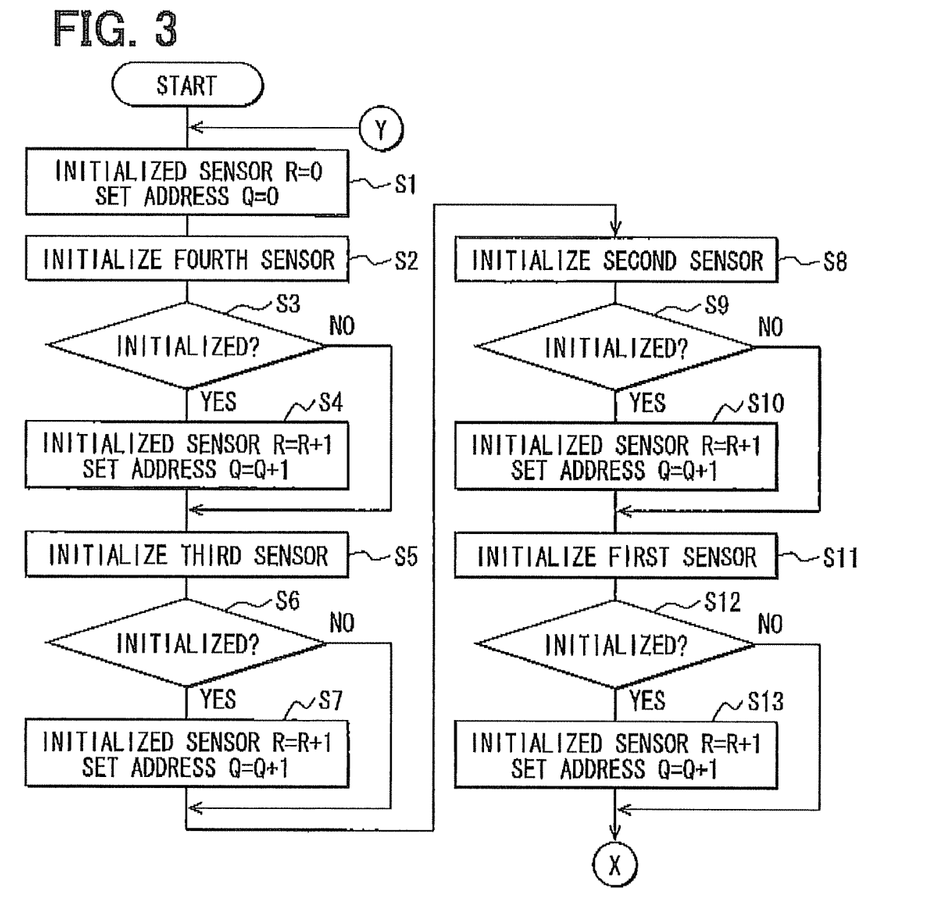
FIG. 3 is a first flowchart showing an operation of the communication device for a passenger protection system according to the first or a second embodiment.

At step S1 in FIG. 3, the ECU control unit 21 counts the initialized sensors R and the set addresses Q. It is assumed that the counts are 0 after having being reset.

At step S2, the fourth sensor unit 15d4, which is at the last stage when counted from the ECU 18E, is initialized first. That is, the identification address 0001, which is an initial value corresponding to the number of address setting instruction (first time) from the ECU 18E is set in the first memory unit 32a by the sensor control unit 32. This set address 0001 and the characteristic information D are transmitted to the ECU 18E, and the constant current unit 31 is turned off for transition to the sleep mode.

It is checked at step S3 whether the initialization of the fourth sensor unit 15d4 has been completed. If the set address 0001 and the characteristic information D haven been received from the fourth sensor unit 15d4 and recognized by the ECU control unit 21, it is determined that the initialization has been completed. In this instance, at step S4, the initialized sensor count R and the set address count Q are incremented as R=R+1 and Q=Q+1 in the ECU control unit 21, respectively.

If the initialization of the fourth sensor unit 15d4 has not been completed, that is, No at step S3, the following processing is performed. If the initialization has not been completed, for example, if the current detection unit 33 in the fourth sensor unit 15d4 has not been able to detect the current or the characteristic information has not been transmitted although the address setting has been performed, the initialized sensor count R is 0 and the set address count Q is incremented to 1.

If a failure is present in the fourth sensor unit 15d4, for example, if the address setting has not been performed and the characteristic information has not been transmitted either, the initialized sensor count R is 0 and the set address count Q is also 0. When the ECU 18E receives the address setting response from the fourth sensor unit 15d4, it transmits the second-time address setting instruction.

At step S5, the third sensor unit 15c3, which is the pre-stage of the fourth sensor unit 15d4, is initialized next. That is, when the address 0001 has been set in the fourth sensor unit 15d4 in the post-stage, the address 0010, which follows the preceding address 0001 and corresponds to the number of address setting instructions (second time) from the ECU 18E, is set in the first memory unit 32a by the sensor control unit 32 of the third sensor unit 15c3. This set address 0010 and the characteristic information C are transmitted to the ECU 18E, and the constant current unit 31 is turned off for transition to the sleep mode.

It is checked at step S6 whether the initialization of the third sensor unit 15c3 has been completed. If the set address 0010 and the characteristic information C have been received from the third sensor unit 15c3 and recognized by the ECU control unit 21, it is determined that the initialization has been completed. In this instance, at step S7, the initialized sensor count R and the set address count Q are both incremented to R=2 and Q=2 if the initialized sensor count R and the set address count Q are R=1 and Q=1 at step S4.

If the initialized sensor count R and the set address count Q at step S4 are R=0 and Q=1, on the other hand, the initialized sensor count R and the set address count Q are incremented to R=1 and Q=2. If the initialized sensor count R and the set address count Q at step S4 are R=0 and Q=0, the initialized sensor count R and the set address count Q are incremented to R=1 and Q=1.

If it is determined at step S6 that the initialization has not been completed, for example, if the current detection unit 33 in the third sensor unit 15c3 has not been able to detect the current or the characteristic information has not been transmitted although the address setting has been performed, only the set address count Q is incremented to 1 at step S7.

If a failure is present in the third sensor unit 15c3 at step S6, for example, both the initialized sensor count R and the set address count Q at step S7 remain the same as the preceding step S4. When the ECU 18E receives the address setting response from the third sensor unit 15c3, it transmits the third-time address setting instruction.

At step S8, the second sensor unit 15b2, which is the pre-stage of the third sensor unit 15c3, is initialized next. That is, when the address 0010 corresponding to the number of address setting instructions (third time) has been set in the third sensor unit 15c3 in the post-stage, the address 0100, which follows the address 0010, is set in the first memory unit 32a by the sensor control unit 32 of the second sensor unit 15b2. This set address 0100 and the characteristic information B are transmitted to the ECU 18E, and the constant current unit 31 is turned off for transition to the sleep mode.

It is checked at step S9 whether the initialization of the second sensor unit 15b2 has been completed. If the set address 0100 and the characteristic information B have been received from the second sensor unit 15b2 and recognized by the ECU control unit 21, it is determined that the initialization has been completed. In this instance, at step S10, the initialized sensor count R and the set address count Q are both incremented to R=3 and Q=3 if the initialized sensor count R and the set address count Q are R=2 and Q=2 at step S7.

If the initialized sensor count R and the set address count Q at step S7 are R=1 and Q=2 on the other hand, the initialized sensor count R and the set address count Q are incremented to R=2 and Q=3. If the initialized sensor count R and the set address count Q at step S7 are R=1 and Q=1, the initialized sensor count R and the set address count Q are incremented to R=2 and Q=2.

If it is determined at step S9 that the initialization has not been completed, for example, if the current detection unit 33 in the second sensor unit 15b2 has not been able to detect the current or the characteristic information has not been transmitted although the address setting has been performed, only the set address count Q is incremented by 1 at step S10. If a failure is present in the second sensor unit 15b2 at step S9, for example, both the initialized sensor count R and the set address count Q at step S10 remain the same as in the preceding step S7. When the ECU 18E receives the address setting response from the second sensor unit 15b2, it transmits the fourth-time address setting instruction.

At step S11, the first memory unit 32a of the first sensor unit 15a1, which is the pre-stage of the second sensor unit 15b2, is initialized next. That is, when the address 0100 has been set in the second sensor unit 15b2 in the post-stage, the address 1000, which follows the address 0100 of the preceding address 0100, is set in the first memory unit 32a by the sensor control unit 32 of the first sensor unit 15a1 in correspondence to the number of address setting instructions (fourth time). This set address 1000 and the characteristic information A are transmitted to the ECU 18E, and the constant current unit 31 is turned off for transition to the sleep mode.

It is checked at step S12 whether the initialization of the first sensor unit 15a1 has been completed. If the set address 1000 and the characteristic information A have been received from the first sensor unit 15a1 and recognized by the ECU control unit 21, it is determined that the initialization has been completed. In this instance, at step S13, the initialized sensor count R and the set address count Q are both incremented to R=4 and Q=4 if the initialized sensor count R and the set address count Q are R=3 and Q=3 at step S10.

If the initialized sensor count R and the set address count Q at step S10 are R=2 and Q=3 on the other hand, the initialized sensor count R and the set address count Q are incremented to R=3 and Q=4. If the initialized sensor count R and the set address count Q at step S10 are R=2 and Q=2, the initialized sensor count R and the set address count Q are incremented to R=3 and Q=3.

If it is determined at S12 that the initialization has not been completed, for example, if the current detection unit 33 in the first sensor unit 15a1 has not been able to detect the current or the characteristic information has not been transmitted although the address setting has been performed, only the set address count Q is incremented by 1 at step S13. If a failure is present in the first sensor unit 15a1 at step S9, for example, both the initialized sensor count R and the set address count Q at step S13 remain the same as in the preceding step S10. By the above-described processing operation, initialization of all the sensor units 15a1 to 15d4 is finished.

Figure 4:
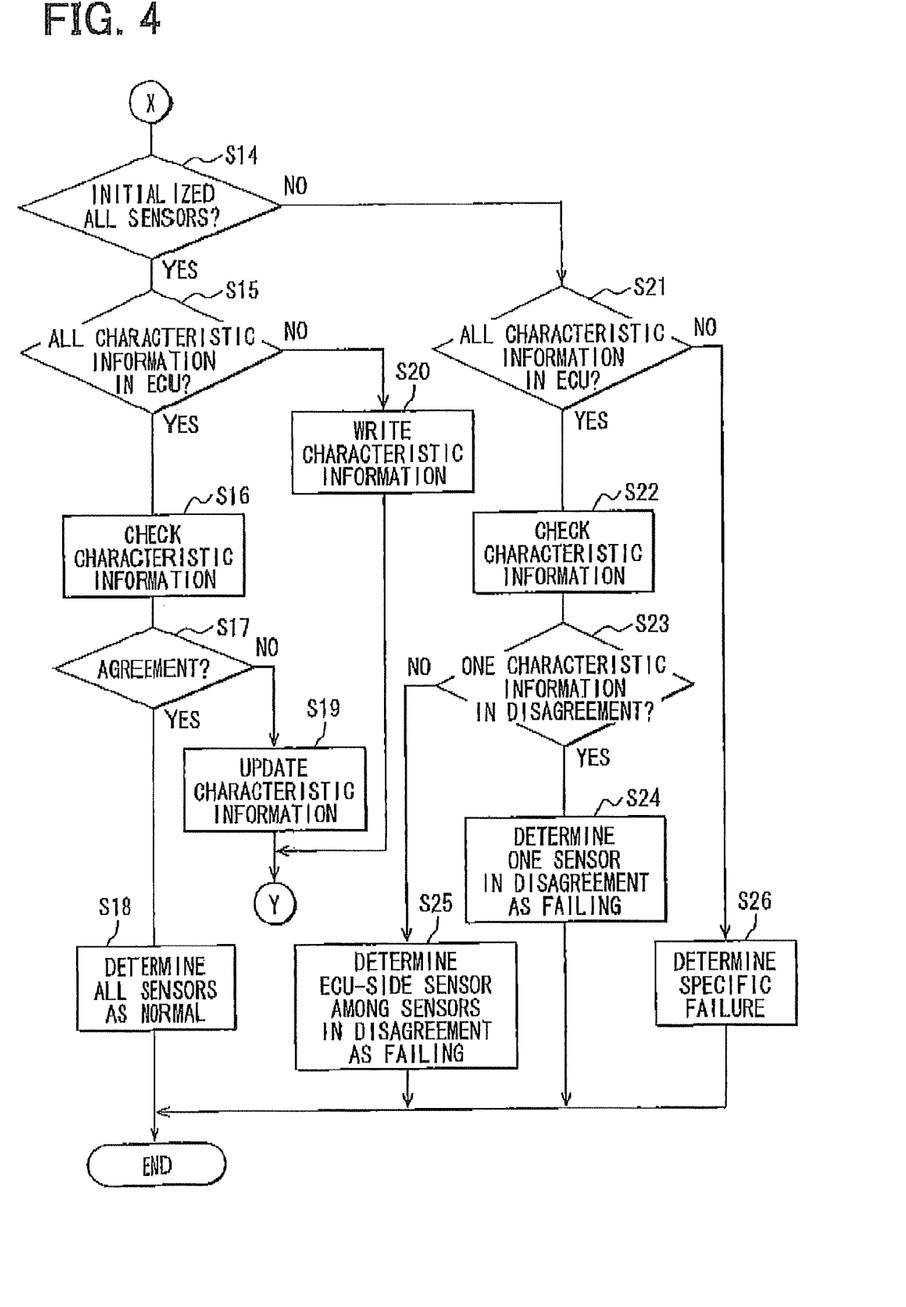
FIG. 4 is a second flowchart showing an operation of the communication device for a passenger protection system according to the first embodiment.

Then it is checked at step S14 in FIG. 4 by the ECU control unit 21 whether all the sensor units have been initialized. Specifically, it is checked whether the initialized sensor count R counted by the ECU control unit 21 is 4, which is the total number of all sensors. If this check result is Yes, it is checked at step S15 whether all the characteristic information A to D are stored in the memory unit 22.

If the check result at step S15 is Yes, the characteristic information A to D of all the sensor units 15a1 to 15d4 are read out from the ECU control unit 21 into the failure check unit 23 at step S16. These characteristic information A to D are checked up by the failure check unit 23 with the characteristic information A to D stored in the memory unit 22. If it is determined at step S17 that the check result indicates agreement, it is determined by the failure check unit 23 at step S18 that all the sensor units 15a1 to 15d4 are normal and the initialization processing has been finished.

It is assumed here that the characteristic information are determined to be in disagreement at step S17. In this case, the characteristic information different from the characteristic information stored in the memory unit 22 is transmitted from the sensor units, in the initialization at this time. It is assumed as one example that, under a condition that the characteristic information C of the third sensor unit 15c3 is stored in the memory unit 22, the characteristic information E of the third sensor unit 15c3 is received by the ECU control unit 21 and inputted to the failure check unit 23 as a result of the initialization at this time. This means that, after the characteristic information C of the third sensor unit 15c3 has been stored in the memory unit 22, the third sensor unit 15c3 was replaced with other sensor unit, which has the different characteristic information E.

If the check result at step S17 is No, the ECU control unit 21 rewrites and updates the characteristic information C, which is stored in the memory unit 22 and in disagreement, to the characteristic information E, which has been read from the ECU control unit 21 to the failure check unit 23 as a result of the initialization at this time. After this updating, the above-described initialization processing is repeated by returning to step S1.

If it is determined at step S15 by the ECU control unit 21 that any one of the characteristic information A to D is not stored in the memory unit 22, the characteristic information A to D of all the units 15a1 to 15d4 received by the ECU control unit 21 this time are written and stored in the memory unit 22. After this storing operation, the above-described initialization processing is repeated by returning to step S1.

If it is determined at step S14 by the ECU control unit 21 that the initialization of all the units has not been completed, it is checked at step S21 by the ECU control unit 21 whether all the characteristic information A to D are stored in the memory unit 22. If the check result at step S21 is Yes, the characteristic information of the sensor units received by the ECU control unit 21 in the initialization at this time are read into the failure check unit 23 and checked up by the failure check unit 23 with the respective characteristic information A to D stored in the memory unit 22. Then, it is checked at step S23 whether the characteristic information, which is in disagreement, is only one.

For example, if the ECU control unit 21 received in the initialization at this time the characteristic information A to C of three sensor units (for example, 15a1 to 15c3), which is less by one than the number of all the sensor units, that is, four, these characteristic information A to C are read in and checked by the failure check unit 23 at step S22.

In this case, it is determined at step S23 that one characteristic information D, which is other than the three characteristic information A to C, is in disagreement. As a result, it is determined at step S24 that the fourth sensor unit 15d4 having the characteristic information D is failing.

On the other hand, if the ECU control unit 21 has received in the initialization at this time the characteristic information A and C of plural sensor units, for example, 15a1 and 15c3 shown in FIG. 2, which is less by two than the number of all the sensor units, that is, four, these characteristic information A and C are read in and checked by the failure check unit 23 at step S22.

In this case, it is determined at step S23 that two characteristic information B AND D, which are other than the two characteristic information A and C, are in disagreement. As a result, it is determined at step S25 by the failure check unit 23 that the second sensor unit 15b2, which is closest to the ECU 18E between the second sensor unit 15b2 and the fourth sensor unit 15d4 having the respective characteristic information B AND D in disagreement, is failing.

If these two characteristic information B AND D are in disagreement, it is possibly estimated that both the second sensor unit 15b2 and the fourth sensor unit 15d4 are failing or only the second sensor unit 15b2, which is other than the last stage, is failing. If the second sensor unit 15b2 is failing, the same address as that of the fourth sensor unit 15d4 in the last stage is set to the second sensor unit 15b2. As a result, the transmission signal waveforms interfere and the ECU control unit 21 cannot recognize both of the characteristic information B AND D. In this case, although the fourth sensor unit 15d4 having the characteristic information D is normal, the characteristic information D cannot be recognized.

If the ECU control unit 21 determines that both sensor units are failing, the fourth sensor unit 15d4 of the last stage is erroneously determined to be failing although it is normal. For this reason, after determining at step S25 that the second sensor 15b2, which is at the closest side to the ECU 18E between the sensor units 15b2 and 15d4, to be failing, the second sensor unit 15b2 is replaced with a normal sensor unit and the initialization is performed again. It is thus possible to check whether the fourth sensor unit 15d4 in the last stage is really failing.

If it is not determined at step S21 by the ECU control unit 21 that all the characteristic information A to D are stored in the memory unit 22, the failure check unit 23 determines at step S26 that a specific failure is present.

The communication device for a passenger protection system according to the first embodiment includes the ECU 18E for controlling the passenger protection device, which protects a passenger at vehicle collision, and the plurality of sensor units 15a1 to 15d4, which are connected in the daisy chain form to the ECU 18E without bus switches and transmit acceleration signals to the ECU 18E by detecting vehicle acceleration.

The first embodiment is characterized in that the sensor units 15a1 to 15d4 include the sensor control units 32, respectively. The sensor control units 32 transmit the respective set addresses and the respective characteristic information to the ECU 18E after the initialization operation, in which the identification addresses are set in the sensor units 15a1 to 15d4 respectively in correspondence to the address setting instructions of the ECU 18E.

Further, the ECU 18E includes the memory unit 22 and the failure check unit 23. The memory unit 22 stores as correspondence information, in which the set addresses transmitted from the sensor units 15a1 to 15d4 and the characteristic information are paired for each sensor unit. The failure check unit 23 checks up the set addresses and the characteristic information transmitted from the sensor units 15a1 to 15d4 with the correspondence information with respect to each of the set addresses, if the set address and the characteristic information are stored in the memory unit 22 for each sensor unit. If the check result indicates that one characteristic information is in disagreement, the failure check unit 23 determines that the sensor unit having such characteristic information is failing.

According to this configuration, if one sensor unit is failing, its failure is determined accurately.

If there are plural characteristic information in disagreement, the failure check unit 23 determines that the sensor unit, which has the characteristic information closest to the ECU 18E, is failing.

According to this configuration, if only the second sensor unit 15b2 other than that of the last stage is failing in a case that two characteristic information B AND D, for example, are in disagreement, the second sensor unit 15b2 is set with the same address by the sensor control unit 32 as that of the fourth sensor unit 15d4 of the last stage. As a result, the transmission signal waveforms of both of the second sensor unit 15b2 and the fourth sensor unit 15d4 interfere and the ECU control unit 21 cannot recognize both of the characteristic information B AND D. In this case, it is determined by the failure check unit 23 that the second sensor unit 15b2, which is closest to the ECU 18E, is failing. If the second sensor unit 15b2 is replaced with a normal one and initialization is performed again, it is possible to check whether the fourth sensor unit 15d4 of the last stage is really failing.

If the set address and the characteristic information are not stored in a pair as the correspondence information of each sensor unit in the memory unit 22, the ECU control unit 21 stores the set address and the characteristic information received from each sensor unit.

If the set addresses and the characteristic information of all of the sensor units 15a1 to 15d4 are not received by the ECU control unit 21 and the set address and the characteristic information of each sensor unit are not stored in the memory unit 22, the failure check unit 23 determines that there is a specific failure, which is other than failures of the sensor units 15a1 to 15d4.

According to this configuration, the specific failure can be determined. The specific failure is other than the failure of the sensor unit having the characteristic information, which is closest to the ECU 18E and the failure of sensor unit having one characteristic information.

Further, the ECU control unit 21 updates characteristic information by writing, over the characteristic information stored in the memory unit 22 and in disagreement, the characteristic information, which is determined to be in disagreement with the characteristic information stored in the memory unit 22 among the received characteristic information of all the sensor units upon reception of the set addresses and the characteristic information from all of the sensor units.

According to this configuration, it is possible to initialize the third sensor unit 15c3 after replacement, even when the third sensor unit 15c3, which originally had its characteristic information C as stored in the memory unit 22, is replaced later for some reason such as failure with the third sensor unit 15c3, which has different characteristic information E.

Second Embodiment

A communication device for a passenger protection system according to a second embodiment of the present invention is configured in the similar manner as in the first embodiment. However, the function of the structural parts is different as described below.

The failure check unit 23 is configured to specify an open-failure that indicates disconnection of connecting lines among the sensor units 15a1 to 15d4 or between the ECU 18E and the first sensor unit 15a1 in correspondence to the initialized sensor count and the set address count counted by the ECU control unit 21.

The operation of the above-configured communication device for a passenger protection system will be described with reference to flowcharts shown in FIG. 3, FIG. 5 and FIG. 6. The initialization operation in all the sensor units 15a1 to 15d4 is the same as described with reference to the flowchart of FIG. 3 in the first embodiment. The operation performed as shown in FIG. 3 is therefore omitted in the operation of the second embodiment.

Figure 5:
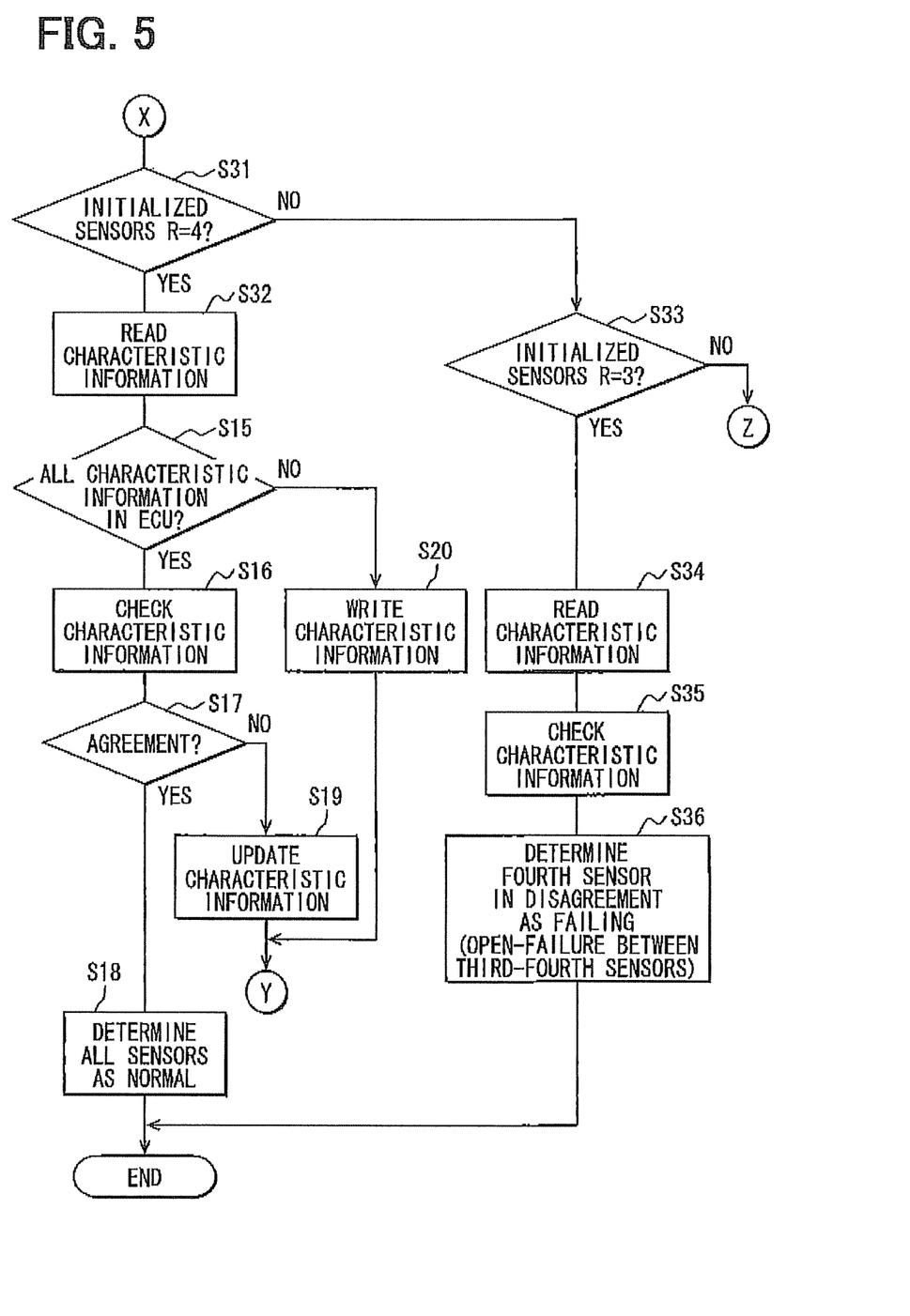
FIG. 5 is a third flowchart showing an operation of the communication device for a passenger protection system according to the second embodiment.

Following the processing operation of steps S1 to S13 shown in FIG. 3, it is checked at step S31 shown in FIG. 5 whether the initialized sensor count R counted by the ECU control unit 21 is 4 (all sensors). If the check result is Yes, the characteristic information A to D of all the sensor units 15a1 to 15d4 are read from the ECU control unit 21 into the failure check unit 23 at step S32. Then the similar processing of steps S16 to S20 is performed as described above with reference to FIG. 4.

If it is determined at step S31 that the initialized sensor count R is not 4 (all sensors), on the other hand, it is checked at step S33 whether the initialized sensor count R is 3. If the check result indicates 3, three characteristic information, for example A to C of the three sensor units 15a1 to 15c3, are read from the ECU control unit 21 into the failure check unit 23.

At step S35, each of the characteristic information A to D stored in the memory unit 22 is checked up with each of the characteristic information A to C read in at step S34 by the failure check unit 23. This check result indicates that the characteristic information D stored in the memory unit 22 has not been transmitted from the unit 15d4 and is not present. It is therefore determined at step S36 by the failure check unit 23 that the characteristic information D is in disagreement and the fourth sensor unit 15d4 having this characteristic information is failing.

In this instance, the initialized sensor count is determined to be R=3 because of no reception of the characteristic information D. It is therefore possible to determine that the open-failure is present between the third sensor unit 15c3 and the fourth sensor unit 15d4.

Figure 6:
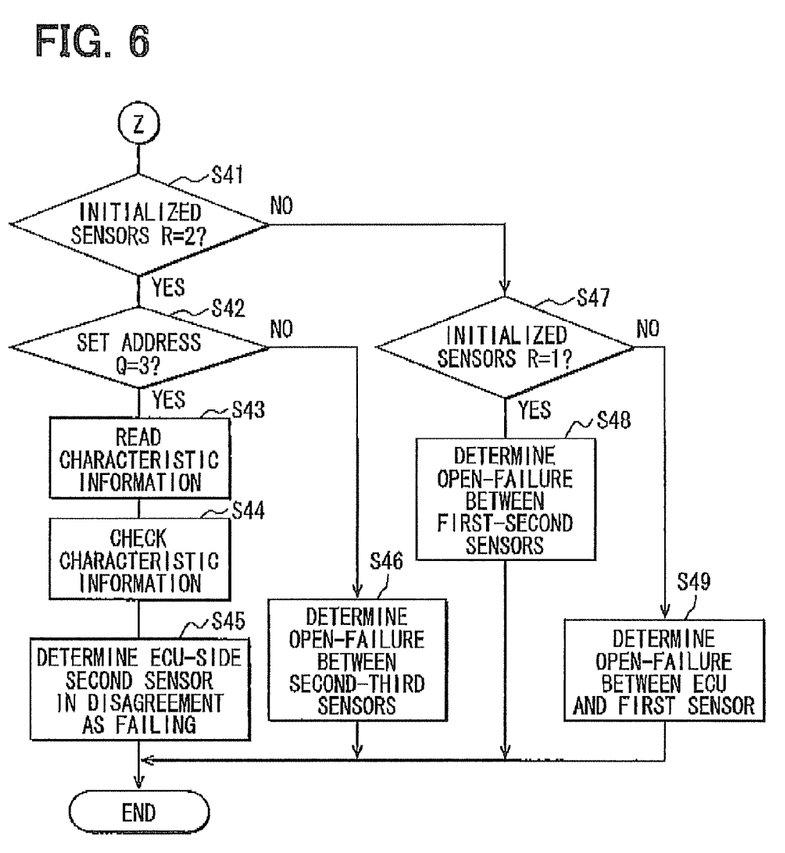
FIG. 6 is a fourth flowchart showing an operation of the communication device for a passenger protection system according to the second embodiment.

If it is determined at step S33 that the initialized sensor count R is not 3, it is further checked at step S41 in FIG. 6 whether the initialized sensor count R is 2. If this check result indicates R=2, it is checked at step S42 by the failure check unit 23 whether the set address count Q counted by the ECU control unit 21 is 3. If the check result indicates Q=3, step S43 is performed.

If the set address count and the initialized sensor count are Q=3 and R=2, this case corresponds to the example represented by the table shown in FIG. 2. In this case, as indicated in the row of "initialization" in the table, the second sensor unit 15b2 and the fourth sensor unit 15d4 are NG and the first sensor unit 15a1 and the third sensor unit 15c3 are OK. Therefore, the initialized sensor count is 2. Further, as indicated in the row of "address" in the table, the address of the first sensor unit 15a1 is 0100, the address of the third sensor unit 15c3 is 0010 and the addresses of the second sensor unit 15b2 and the fourth sensor unit 15d4 are both 0001. Therefore, the set address count is 3.

Since the second sensor unit 15b2 and the fourth sensor unit 15d4 have the same address 0001, the characteristic information of both units cannot be recognized by the ECU control unit 21 because of interference between the same response signal waveforms.

Under such a data reception, two characteristic information A and C of the first sensor unit 15a1 and the third sensor unit 15c3 are read in from the ECU control unit 21 into the failure check unit 23 at step S43. At step S44, each of the characteristic information A to D stored in the memory unit 22 are checked up by the failure check unit 23 with each of the characteristic information A and C read in at step S43. At step S45, the failure checkup is performed as follows.

The check result of step S44 indicates that the failure check unit 23 determined that the characteristic information B and D stored in the memory unit 22 are in disagreement and have not been transmitted from the sensor units. In this case, however, it is recognized by the failure check unit 23 that the same address 0001 has been set between the two sensor units because of the initialized sensor count R=2 and the set address count Q=3. The order of connection of the second sensor unit 15b2 and the fourth sensor unit 15d4, which have respective characteristic information B and D determined to be in disagreement by the above checkup operation, to the ECU 18E is recognized. It is determined that the second sensor unit 15b2, which is at the closer side to the ECU 18E is failing.

If it is determined at step S42 that the set address count Q is not 3, the failure check unit 23 determines at step S46 that the set address count Q is 2 because the initialized sensor count R is 2. In this case, it is recognized that only two sensor units 15a1 and 15b2 are connected to the ECU 18E and the third sensor unit 15c3 and the subsequent sensor are disconnected. It is thus determined that there is an open-failure, in which the connecting line is disconnected between the second sensor unit 15b2 and the third sensor unit 15c3.

If it is determined at step S41 that the initialized sensor count R is not 2, it is checked at step S47 whether the initialized sensor count R is 1. If this checkup result indicates R=1, it is recognized at step S48 by the failure check unit 23 that only the first sensor unit 15a1 is connected and the second sensor unit 15b2 and the subsequent sensor units are disconnected. It is thus determined that an open-failure is present between the first sensor unit 15a1 and the second sensor unit 15b2.

If it is determined at step S47 that the initialized sensor count R is not 1, it is recognized at step S49 by the failure check unit 23 that no sensor unit is connected to the ECU 19E. It is thus determined that an open-failure is present between the ECU 18E and the first sensor unit 15a1.

The communication device for the passenger protection system according to the second embodiment, the failure check unit 23 is configured to determine that there is an open-failure, in which the sensor unit of the last stage included among the initialized sensor count R and the sensor unit subsequent to the sensor unit of the last stage, if the count Q of the set addresses received by the ECU control unit 21 and the count R of the initialized sensor unit, which is counted up at the time of reception with the set address A, are the same or less than the total number of all the sensors.

As a result, if the set address count R and the initialized sensor count Q are both 2 and less than the total number, 4, of all the sensor units 15a1 to 15d4, it can be determined that an open-failure is present between the second sensor unit 15b2, which is the last stage of the two sensor units 15a1, 15b2, and the third sensor unit 15c3 subsequent to the second sensor unit 15b2.

Third Embodiment

Figure 7:
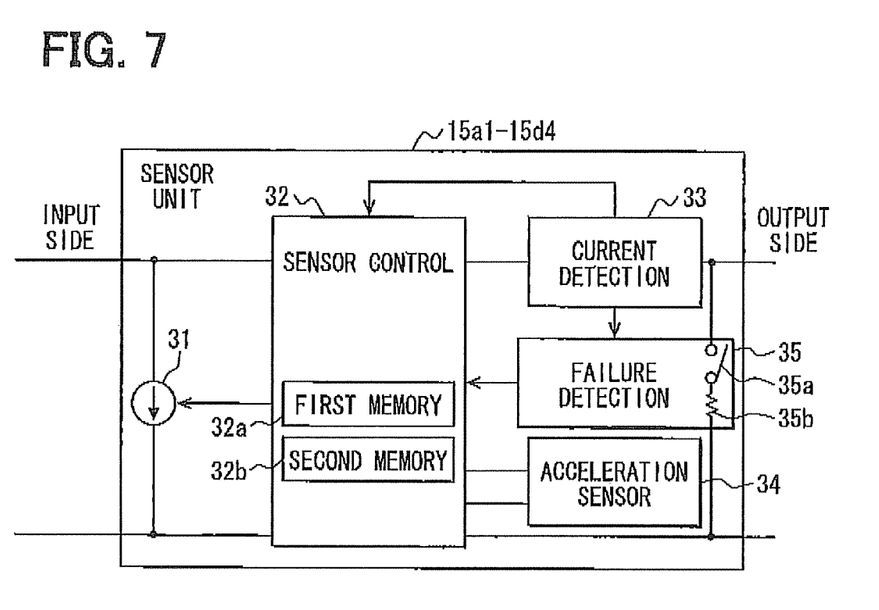
FIG. 7 is a block diagram of each sensor unit of the communication device for a passenger protection system according to the second embodiment.

A communication device for a passenger protection system according to a third embodiment shown in FIG. 7 differs from the first embodiment in the configuration of a sensor unit. That is, according to this embodiment, each sensor unit 15a1 to 15d4 includes a failure detection unit 35.

The failure detection unit 35 includes a switch 35a and a resistor 35b, which are connected in series between a power supply side line at an output side of the current detection unit 33 and a ground side line. When the sensor unit is activated, that is, all load circuits including the constant current unit 31 are rendered operative, the switch 35a is turned on for a fixed period so that the current flowing in the current detection unit 33 may be detected. If this detected current value is less than a predetermined value (second predetermined value), the failure detection unit 35 determines that a failure is present. If it is equal to or greater than the second predetermined value, the failure detection unit 35 determines that any failure is not present. This determination result is outputted to the sensor control unit 32.

The sensor control unit 32 does not perform the address setting operation when it is determined that the failure is present. It controls the constant current unit 31 to the off-state. In this control, not only the address response but also the characteristic information are transmitted to the ECU 18E.

According to this configuration, when a failure of the current detection unit 33 is detected by the failure detection unit 35 in the second sensor unit 15b2, for example, the address setting is not performed and the constant current unit 31 is turned off by the sensor control unit 32.

In this case, since the address response and the characteristic information are not transmitted to the ECU 18E, the failure check unit 23 in the ECU 18E determines that the characteristic information B of the second sensor unit 15b2, which does not transmit the response, is in disagreement. Thus the second sensor unit 15b2 is determined to be failing.

As described above, the communication device for a passenger protection system according to the third embodiment further includes the failure detection unit 35 in each of the sensor units 15a1 to 15d4. The failure detection unit 35 detects current flowing in the sensor unit when the sensor unit is activated, and determines presence and absence of the failure if the detected current value is less than and equal to or greater than the second predetermined value, respectively. The sensor control unit 32 does not perform the address setting and controls the constant current unit 31 to the off-state, when the failure detection unit 35 determines that a failure is present.

According to this configuration, if the failure detection unit 35 detects the failure of the current detection unit 33 in the second sensor unit 15b2, for example, the address setting is not performed and the constant current unit 31 is turned off by the sensor control unit 32. Thus, the second sensor unit 15b2 is turned off. For this reason, the address response and the characteristic information are not transmitted to the ECU 18E. The failure check unit 23 in the ECU 18E determines that the characteristic information B of the second sensor unit 15b2, which does not transmit the response, is in disagreement. Thus the second sensor unit 15b2 is determined to be failing.

Although the acceleration sensor 34 is assumed to be provided in the above-described first to third embodiments, it may be a sensor of other function such as a pressure sensor. In case of the pressure sensor, the sensor control unit 32 controls transmission of impact pressure, which is applied to the vehicle 10 and detected by the pressure sensor, to the ECU 18E.

The invention claimed is:

1. A communication device for a passenger protection system comprising:
    an ECU configured to control a passenger protection device, which protects a passenger at time of vehicle collision and the ECU including a failure check unit and a memory unit; and
    a plurality of sensor units connected to the ECU in a daisy chain form configured to detect acceleration of the vehicle and transmitting acceleration signals to the ECU,
    wherein the sensor units, after being initialized by setting of respective set addresses in correspondence to address setting instructions of the ECU, transmit respective set address and respective characteristic information to the ECU,
    the memory unit of the ECU stores the characteristic information as correspondence information, such that the characteristic information of a given sensor unit is associated with the set address of the given sensor unit, and
    the failure check unit compares the characteristic information transmitted from the sensor units with the correspondence information with respect to each of the set addresses, if the characteristic information are stored in the memory unit, and the failure check unit determines that the given sensor unit has failed
    when the characteristic information received is different than the correspondence information stored in the memory unit, and
    the characteristic information for the sensor units are a fixed identifier and are different for each of the sensor units
    each of the plurality of sensor units includes a first memory and a second memory, and stores the set address in the first memory and stores the characteristic information in the second memory, the set address is set in correspondence to an address setting instruction of the ECU during initialization, the address setting instruction is designated in an order of the daisy chain connection of the plurality of sensor units,
    the sensor units, after being initialized, transmit respective set address and respective characteristic information to the ECU as paired information, and
    the failure check unit compares the characteristic information transmitted in pairs from the sensor units with each of the set addresses stored in the memory unit.

2. The communication device for a passenger protection system according to claim 1, wherein:
    the ECU further includes a control unit, which stores the characteristic information transmitted from the sensor unit as the correspondence information associated with the set address, if the correspondence information is not stored in the memory unit.

3. The communication device for a passenger protection system according to claim 1, wherein:
    the failure check unit determines that, if the set addresses and the characteristic information are not received from all of the sensor units and the set addresses and the characteristic information of each sensor unit are not stored in the memory unit, a specific failure, which is other than the failure of the sensor units, is present.

4. The communication device for a passenger protection system according to claim 1, wherein:
    the control unit updates, upon reception of the set addresses and the characteristic information from all of the sensor units, characteristic information by writing, over the characteristic information stored in the memory unit, the characteristic information, which is determined to be different from the characteristic information stored in the memory unit.

5. The communication device for a passenger protection system according to claim 1, wherein:
    the failure check unit determines that, if a set address count of the set addresses received by the control unit and an initialized sensor count of initialized sensor units counted up at reception of the characteristic information with the set address are equal to each other and both are less than a count of all of the sensor units, an open-failure indicating disconnection is present between the sensor unit in the last stage included in the initialized sensor count and the sensor unit subsequent to the last stage.

6. The communication device for a passenger protection system according to claim 1, wherein:
    each of the sensor units includes a failure detection unit, which detects current flowing in the sensor unit when the sensor unit is activated, and determines presence of the failure if a detected current value is less than a predetermined value and determines absence of the failure if the detected current value is equal to or greater than the predetermined value; and each of the sensor units controls the sensor unit to an off-state without performing the address setting, when the failure detection unit determines that a failure is present.

7. The communication device for a passenger protection system according to claim 1, wherein:
the failure check unit determines that, if more than one sensor units have the characteristic information, which are different than the correspondence information, a sensor unit closest to the ECU among the more than one sensor units is failing.

8. The communication device for a passenger protection system according to claim 1, wherein:
each of the sensor units sets the address thereof to a value, which corresponds to a number of the address setting instructions received from the ECU, and has a memory storing therein the characteristic information, which is different from sensor unit to sensor unit.

9. The communication device of claim 1 wherein:
the ECU stores the characteristic information and the set address of each of the sensor units in association with each other as correspondence information in the memory unit when the memory unit is empty, and
when the failure check unit determines that one or more of the sensor units has failed, the ECU updates the memory unit and stores the characteristic information and the set address received from the sensor units in association with each other as correspondence information in the memory unit.

10. The communication device of claim 1 wherein:
the address setting instruction is designated in an order from a remote sensor unit to a close sensor unit, the remote sensor unit and the close sensor unit are among the plurality of sensor units, the remote sensor unit is farthest from the ECU from among the plurality of sensor units and the close sensor unit is closest to the ECU from among the plurality of sensor units.

11. The communication device for a passenger protection system according to claim 7, wherein:
the ECU further includes a control unit, which stores the characteristic information transmitted from the sensor unit as the correspondence information associated with the set address, if the correspondence information is not stored in the memory unit.

12. The communication device for a passenger protection system according to claim 7, wherein:
the failure check unit determines that, if the set addresses and the characteristic information are not received from all of the sensor units and the set addresses and the characteristic information of each sensor unit are not stored in the memory unit, a specific failure, which is other than the failure of the sensor units, is present.

13. The communication device for a passenger protection system according to claim 7, wherein:
the control unit updates, upon reception of the set addresses and the characteristic information from all of the sensor units, characteristic information by writing, over the characteristic information stored in the memory unit, the characteristic information, which is determined to be different from the characteristic information stored in the memory unit.

14. The communication device for a passenger protection system according to claim 7, wherein:

the failure check unit determines that, if a set address count of the set addresses received by the control unit and an initialized sensor count of initialized sensor units counted up at reception of the characteristic information with the set address are equal to each other and both are less than a count of all of the sensor units, an open-failure indicating disconnection is present between the sensor unit in the last stage included in the initialized sensor count and the sensor unit subsequent to the last stage.

15. The communication device for a passenger protection system according to claim 7, wherein:
each of the sensor units includes a failure detection unit, which detects current flowing in the sensor unit when the sensor unit is activated, and determines presence of the failure if a detected current value is less than a predetermined value and determines absence of the failure if the detected current value is equal to or greater than the predetermined value; and
each of the sensor units controls the sensor unit to an off-state without performing the address setting, when the failure detection unit determines that a failure is present.

16. The communication device for a passenger protection system according to claim 2, wherein:
the failure check unit determines that, if the set addresses and the characteristic information are not received from all of the sensor units and the set addresses and the characteristic information of each sensor unit are not stored in the memory unit, a specific failure, which is other than the failure of the sensor units, is present.

17. The communication device for a passenger protection system according to claim 2, wherein:
the control unit updates, upon reception of the set addresses and the characteristic information from all of the sensor units, characteristic information by writing, over the characteristic information stored in the memory unit, the characteristic information, which is determined to be different from the characteristic information stored in the memory unit.

18. The communication device for a passenger protection system according to claim 2, wherein:
the failure check unit determines that, if a set address count of the set addresses received by the control unit and an initialized sensor count of initialized sensor units counted up at reception of the characteristic information with the set address are equal and less than a count of all of the sensor units, an open-failure indicating disconnection is present between the sensor unit in the last stage included in the initialized sensor count and the sensor unit subsequent to the last stage;
each of the sensor units includes a failure detection unit, which detects current flowing in the sensor unit when the sensor unit is activated, and determines presence and absence of the failure if a detected current value is less than and equal to or greater than a predetermined value, respectively; and
each of the sensor units controls the sensor unit to an off-state without performing the address setting, when the failure detection unit determines that a failure is present.

* * * * *